United States Patent [19]
Hertel

[11] 3,947,937
[45] Apr. 6, 1976

[54] CONTROL GROOVE IN CUTTING ELEMENTS FOR METAL WORKING TOOLS

[76] Inventor: Karl Hertel, Oedenberger Strasse 29, D-8500 Nurnberg, Germany

[22] Filed: Aug. 7, 1975

[21] Appl. No.: 602,674

[30] Foreign Application Priority Data
Nov. 16, 1973 Germany............................ 2357180

[52] U.S. Cl..................................... 29/95 R; 29/96
[51] Int. Cl.².......................................... B26D 1/00
[58] Field of Search.............................. 29/95 R, 96

[56] References Cited
UNITED STATES PATENTS

| | | | |
|---|---|---|---|
| 3,187,406 | 6/1965 | Franko................................ | 29/95 R |
| 3,381,349 | 5/1968 | Newcomer........................... | 29/96 |
| 3,395,434 | 8/1968 | Wirfelt................................ | 29/95 R |
| 3,885,281 | 5/1975 | Stambler............................. | 29/95 R |

*Primary Examiner*—Leonidas Vlachos
*Attorney, Agent, or Firm*—Spencer & Kaye

[57] ABSTRACT

In a cutting element for cutting metals and having adjacent surfaces which meet to form a cutting edge, with a chip-controlling groove being formed in one of the surfaces, the groove being composed of a plurality of depressions disposed parallel to one another, spaced apart in the direction of the groove width, and extending along substantially the entire cutting edge, the ability of the groove to effectively deflect chips having a wide range of thicknesses, or cross sections, is improved by forming the groove to have more than two such depressions, with the depressions arranged to form a ridge between each two adjacent depressions, the ridges being located such that, in the direction extending away from the cutting edge, each succeeding ridge is at a higher elevation than the preceding ridges.

5 Claims, 10 Drawing Figures

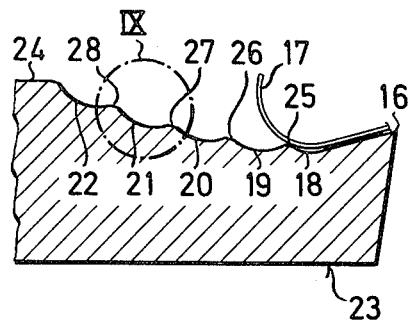
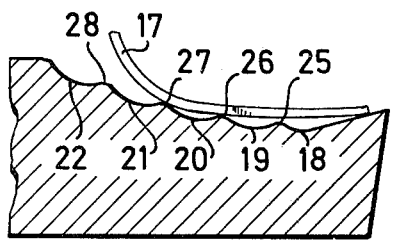
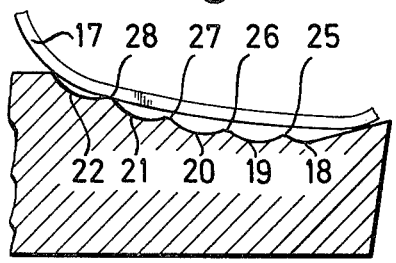
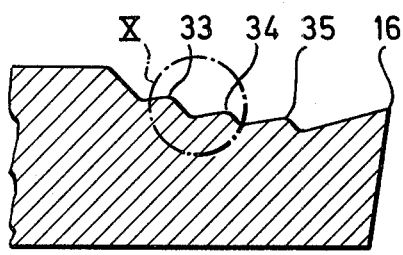
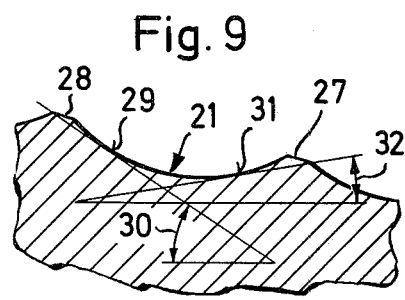
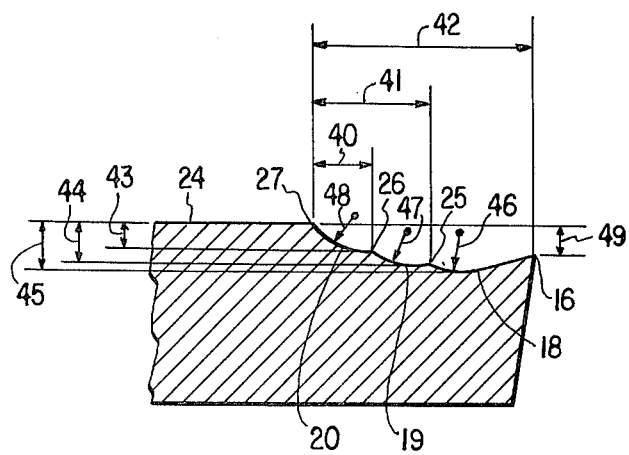

CONTROL GROOVE IN CUTTING ELEMENTS FOR METAL WORKING TOOLS

BACKGROUND OF THE INVENTION

The present invention relates to a control groove disposed on the cutting surface of a cutting tool or cutting element intended for working material in a manner which forms chips, or cuttings, the groove being provided with depressions which are juxtaposed in the transverse direction of the groove, which are parallel to one another, and which extend substantially over the length of the cutting edge.

It is known to provide a control groove in a cutting element for a metal working tool so that the element is able to deflect and break cuttings, or chips, the cross sections of which vary for different advancing speeds. Such a structure is disclosed in U.S. Pat. No. 3,187,406. For this purpose, the groove has a relatively small radius of curvature in the region adjacent to the cutting edge and a larger radius of curvature at a greater distance from the cutting edge.

When the tool is subjected to a slow advancing speed, the cutting, or chip, is already deflected at the beginning of the region having the larger radius of curvature. With a medium advancing speed, the cutting will place itself against the rearward portion of the region of larger radius of curvature, i.e., the portion which is further removed from the cutting edge. It is then deflected there. With a fast advancing speed, the cutting will completely brush past the control groove and is deflected and broken in the region of the transition between the groove and the cutting element surface disposed therebehind. However, when working with very narrow and thin cuttings, of the type generated in precision machining work, this solution has not been found to be fully satisfactory.

For a control groove of the above-mentioned type it has already been proposed, inter alia, to provide two depressions which are parallel to one another in the longitudinal direction of the cutting edge and which are separated from one another by a ridge. This structure serves the purpose of advantageously deflecting and breaking chips with an average cross section. Such structures are disclosed, for example, in German Pat. No. 1,602,968.

SUMMARY OF THE INVENTION

It is an object of the present invention to provide a groove of the above-mentioned type which permits advantageous deflection and breaking of cuttings whose cross sections vary over the range occurring in practice, for almost all materials used in practice.

This and other objects are accomplished by providing more than two depressions, or recesses, and by placing a ridge between adjacent depressions so that each ridge is at a higher level than the preceding ridges in the direction away from the cutting edge. It has been found that this arrangement gives the cutting tool a control groove which provides optimum guidance and breaking up of the cuttings of any cross section, any advancing speed and any material, since each cutting, so-to-speak, finds the groove that suits it best. Beginning with the depression closest to the cutting edge there thus follow a plurality of further depressions with each depression being higher than the preceding depression, going toward the rear in the direction away from the cutting edge. The bottom of the depressions also rises in the direction facing away from the cutting edge, becoming higher from depression to depression toward the rear of the cutting surface.

The ridge between two adjacent depressions may be chamfered in order to form a plateau-like surface.

In order to counteract wear on the ridges between the depressions, it is further provided that the side of a ridge which faces the cutting edge has a steeper pitch than the side facing away from the cutting edge.

BRIEF DESCRIPTION OF THE DRAWING

FIGS. 4, 5 and 6 are cross sectional views along line IV—IV of FIG. 1 but with a larger number of depressions than shown in FIG. 1 and with the path of a cutting indicated for cuttings with three different cross sections.

FIG. 7 is a view similar to that of FIG. 5, but without illustration of a cutting, showing a modified configuration of the ridges and depressions.

FIG. 8 is a cross sectional detail view similar to that of FIG. 7 along cutting line VIII—VIII of Figure showing a further modification to FIGS. 5 and 7.

FIG. 9 is a cross sectional detail view, to an enlarged scale, of the region enclosed by the dot-dashed circle in FIG. 4.

FIG. 10 is a detail view, to an enlarged scale, of a depression similar to the portion enclosed by the dot-dashed circle in FIG. 7.

DESCRIPTION OF THE PREFERRED EMBODIMENTS

Figure 1:
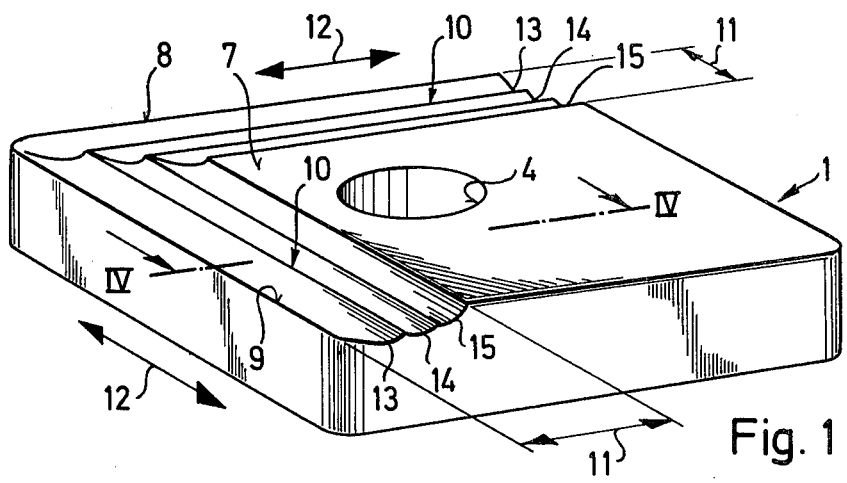
FIG. 1 is a top perspective view of a cutting element to be held in a tool, the element being provided with a control groove according to one embodiment of the present invention.
Figure 2:
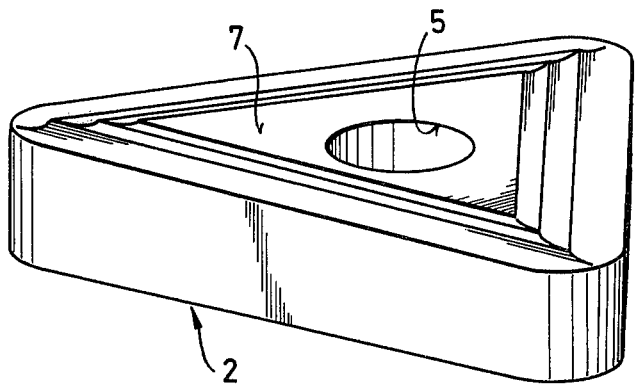
FIG. 2 is a perspective view of another form of cutting element having a groove according to the invention.
Figure 3:
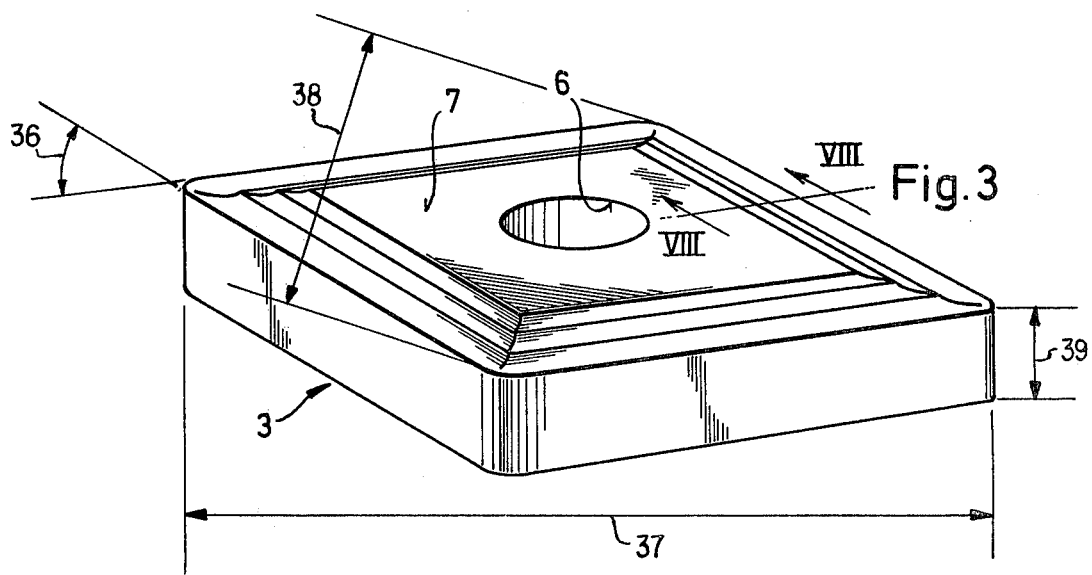
FIG. 3 is a view similar to that of FIG. 2 of another embodiment of the invention.

The cutting elements shown in FIGS. 1–3 are indexable cutters having a plurality of cutting sides or edges. The cutting element 1, 2 or 3, respectively, is provided with a center fastening bore 4, 5 or 6, respectively, to accommodate a fastening means. The holders for fastening the cutting elements are not shown and are not part of the present invention. The cutting elements (1,2,3) are fore instance clampable in holders as shown in U.S. Pat. No. 3,469,296.

In the region of two adjacent cutting edges 8 and 9 of the element shown in FIG. 1, control grooves 10 having a width 11 are provided on the cutting surface 7 of the cutting element 1, each cutting groove being provided with three depressions, or recesses, 13, 14 and 15 which are parallel to one another in the respective longitudinal direction 12.

Several specific configurations for the depressions are shown in FIGS. 4 to 10 and will be described in detail in connection with these figures. In the embodiment shown in FIGS. 4, 5 and 6, the cutting edge 16 is in the process of forming a cutting, or chip, 17.

Beginning with the cutting edge 16 in the direction toward the rearward portion of the cutting element or cutting tool, respectively, five depressions 18, 19, 20, 21 and 22 are provided. From one depression to the next in the direction away from the cutting edge 16, the bottoms of succeeding depressions are at successively higher levels with respect to the surface 24. The depressions 18–22 are separated from one another by respective ridges 25, 26, 27 and 28. The respective ridges also lie at successively higher levels from ridge to ridge, beginning with the ridge 25 closest to the cutting edge 16, when seen in the direction toward the surface 24. Thus, from ridge to ridge, they are successively further removed from the contact, or base, surface 23.

FIG. 9 shows, in detail, the depression 21 between the two ridges 27 and 28. As can be seen, the side 29 of a ridge which faces the cutting edge 16 has a greater pitch angle 30 than the side of the ridge facing away from the cutting edge 16. The pitch angle of side 31 of ridge 27 which faces away from the cutting edge is marked 32.

In the illustrated embodiments, the pitch angles 30 of all of the sides 29 of the ridges facing the cutting edge 16 are the same. However, an embodiment can also be constructed with varying pitch angle values. The same also applies to the sides 31 of a ridge 27 or 28, respectively, facing away from the cutting edge 16.

In the embodiment shown in FIG. 7 the sides of the ridges 33, 34, 35 are substantially planar. At the bottom of each depression, the sides meet at a rounded surface having the form of a portion of a circular cylinder. A portion of the embodiment of FIG. 7 is shown in greater detail in FIG. 10.

EXAMPLE 1 (FIGS. 3 AND 8):

The nose angle 36 is 80°. The long distance 37 is 24 cm, the short distance 38 is about 20.5 cm, the thickness 39 is 5.7 cm. The distance 40 from the cutting edge to the first ridge is 2.9 cm, the distance 41 to the second ridge 26 is 3.5 cm, the distance 42 to the third ridge 27 is 4.0 cm. The distances 43, 44, 45 of the surface 24 to the bottoms of the depressions 20, 19, 18 are 0.3; 0.45 and 0.6 cm. The depressions 18 to 22 have the form of curved grooves. The radius 46 of the depression 18 is 0.8, the radiuses 47 and 48 of the depressions 19 and 20 have 0.6 cm. The distance 49 of the cutting edge 16 to the surface 24 is 0.2 cm.

It will be understood that the above description of the present invention is susceptible to various modifications, changes and adaptations, and the same are intended to be comprehended within the meaning and range of equivalents of the appended claims.

What is claimed is:

1. In a cutting element for cutting metals and having adjacent surfaces which meet to form a cutting edge, with a chip-controlling groove formed in one of the surfaces, the groove being composed of a plurality of depressions disposed parallel to one another, spaced apart in the direction of the groove width, and extending along substantially the entire cutting edge, the improvement wherein said groove is composed of more than two of said depressions, said depressions are arranged to form a ridge between each two adjacent depressions, the ridges being located such that, in the direction extending away from said cutting edge, each succeeding ridge is at a higher elevation than the preceding ridges.

2. An arrangement as defined in claim 1 wherein said depressions are arranged such that, in the direction extending away from said cutting edge, the bottom of each succeeding depression is at a higher elevation than the bottoms of the preceding depressions.

3. An arrangement as defined in claim 2 wherein each said ridge is chamfered to form a plateau-like surface.

4. An arrangement as defined in claim 1 wherein the side of each ridge which faces toward said cutting edge has a steeper pitch than the side of said ridge facing away from said cutting edge.

5. An arrangement as defined in claim 1 wherein said depressions are formed in a manner such that the sides of said ridges are planar and the sides of two adjacent ridges which define a common depression extend toward one another and meet at a cylindrically curved surface.

* * * * *